Dec. 3, 1968    F. G. WEEDEN ET AL    3,414,246
TOWER TRAY
Filed Dec. 19, 1966
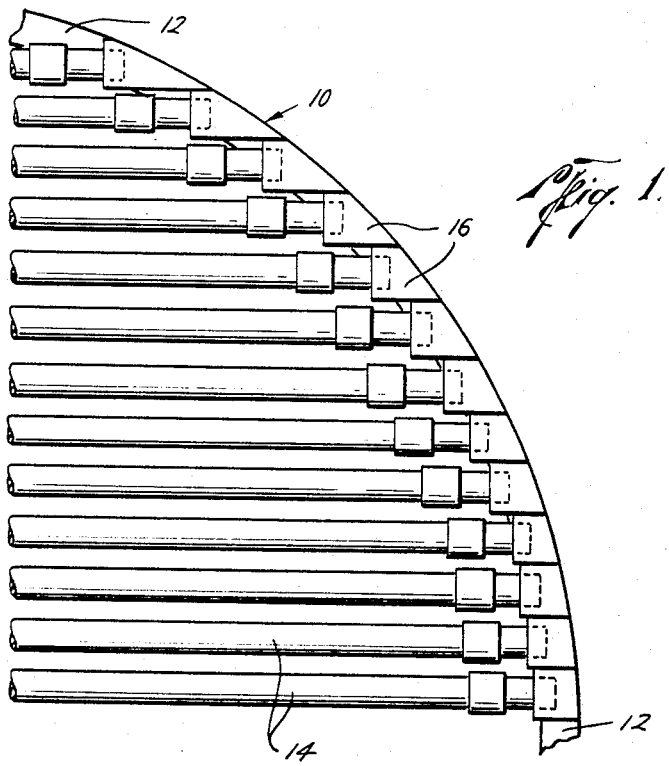
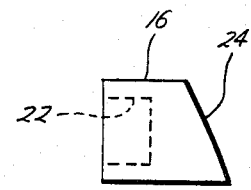
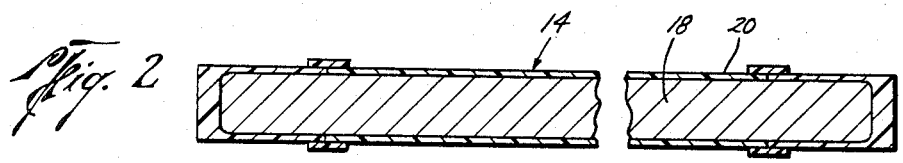
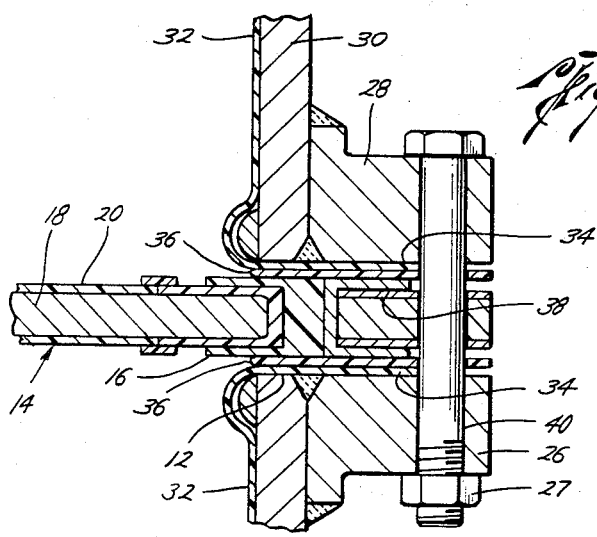
Frank G. Weeden
Gail W. Graves
INVENTORS
James F. Weiler
BY William A. Stout
Dudley R. Dobie, Jr.
Henry W. Hope
ATTORNEYS

United States Patent Office 3,414,246
Patented Dec. 3, 1968

3,414,246
TOWER TRAY
Frank G. Weeden and Gail W. Graves, Houston, Tex., assignors to John L. Dore Co., Houston, Tex., a corporation of Texas
Filed Dec. 19, 1966, Ser. No. 602,781
5 Claims. (Cl. 261—113)

ABSTRACT OF THE DISCLOSURE

This invention relates to an adjustable corrosion-resistant tower tray, comprising an annular support with bosses to secure rods in adjustably spaced relation thereon, in order to provide slots between adjacent rods of desired width. The circular tray is adapted for use in process vessels, absorption and distillation towers, and the like.

---

It would be highly advantageous to provide a corrosion resistant tower tray for use in absorption or distillation columns or other such process vessels to support packing media, demisters or for use in other process vessels requiring mixing of liquids or slurries passing through such vessels. Adjustability of the tray to vary the size of openings within the tray is highly desirable in view of the many varieties and sizes of packing material and diversity of mixing requirements for liquids and slurries within process vessels. The present invention is directed to such a uniquely adaptable tower tray.

It is, therefore, an object of the present invention to provide a structurally rigid and corrosion resistant tower tray uniquely adjustable for varying the size of openings within the tray.

Another object of the present invention is to provide an improved tower tray for use with process vessels, towers and the like having a plurality of corrosion resistant rods in spaced relation and adjustably secured to form an annular openwork.

Yet a further object of the present invention is the provision of an improved tray for use with process vessels, towers and the like having spaced rod means forming an annular openwork wherein individual rods are removable and adjustable for varying spacing between rods.

Still another object of the present invention is to provide a corrosion resistant tower tray formed of fluorocarbon material yet structurally rigid and adjustable for use in duties requiring variable spacing of openwork.

Other and further objects, features and advantages will be apparent from the following description of a presently preferred embodiment of the invention, given for the purpose of disclosure, and taken in conjunction with the accompanying drawings, where like character references designate like parts throughout the several views, and where:

FIGURE 1 is a partial plan view of the present invention,

FIGURE 2 is a partial cross-sectional side view of rod means of the present invention, FIGURE 3 illustrates a spacing boss according to the present invention, and FIGURE 4 is a partial cross-sectional view of the present invention adapted for use with a process vessel or tower.

The present invention generally relates to an improved tray for use in distillation or absorption columns or process vessels and particularly such vessels which handle corrosive substances. The tray device is itself uniquely adapted for resistance to corrosion and at the same time is useful in process vessels requiring mixing of liquids or slurries, wherein the tray is adjustable to vary the open area therein. The tray is structurally rigid and provides excellent support within towers for demisters, Raschig rings, Berl saddles and other such packing media. The tray of the present invention generally comprises a plurality of rods for support annularly within a tower or vessel and having boss means at each end for maintaining the rods in spaced relation and for removably securing the rods to support means within the vessel.

Referring now to FIGURE 1, the present invention is generally designated by the reference numeral 10. A circular or annular support 12 is provided as will be described hereafter on which are mounted a plurality of rods 14. Attached at both ends of each rod 14 are boss members 16 which serve to support each rod in spaced relation with adjacent rods.

As shown in FIGURE 2, each rod is preferably formed of a rigid shaft 18 such as an iron or steel bar, such shaft having a fluorocarbon coating 20 applied thereto. Fluorocarbon materials are highly inert with respect to the commonly encountered corrosive fluids and the majority are capable of use in temperature ranges far exceeding those of other plastic or rubber products of the prior art. Fluorocarbon materials which are particularly useful for coating the rigid shafts 18 include Teflon, a polymerized tetrafluoroethylene resin, fluorothene, a polychlorotrifluoroethylene, Kel–F, a polymerized trifluorochloroethylene resin, fluorinated ethylenepropylene and the like.

Referring now to FIGURE 3, a boss 16 is illustrated having at one end thereof an axial recess 22 and a chamfered edge 24 at the other end thereof. The axial recess 22 adapts the boss 16 to receive an end of the rod 14 of FIGURE 2 while the chamfered edge 24 of the boss 16 adapts the boss for mounting adjacent the arcuate edge of the annular or circular support 12 as shown in FIGURE 1.

In operation and with reference to FIGURE 4, a preferred embodiment of the present invention is shown wherein each of the rods 14 are mounted between adjacent flanges 26 and 28 respectively. As will be recognized, the upper edge of the lower flange 26 provides an annular support 12 as viewed in FIGURE 1. By way of example only, each flange is integrally secured to the wall 30 of a distillation tower or other such process vessel. A corrosion resistant liner 32 is usually provided in these types of vessels when corrosive substances are being processed. The tray device of the present invention is particularly useful under such circumstances since each end 34 of the liner 32 may be folded between the flanges as shown. Sealing gaskets 36 may then be provided together with a spacer ring assembly 38 whereby a sealed joint is provided when the flanges 26 and 28 are bolted together by suitable bolt means 27 through a plurality of holes 40 around the periphery of both flanges.

A unique advantage of the present invention lies in the fact that each boss member 16 may be formed of varying widths so that when spaced as illustrated in FIGURE 1, the open area between rods 14 may in turn be varied. A further advantage lies in the fact that each individual rod 14 is removable from the grid work simply by unbolting the joint formed by the flanges 26 and 28 of FIGURE 4. This removability feature of the present invention is particularly advantageous since only an individual rod need be replaced when it wears rather than the whole tray.

The openwork formed by the plurality of rods 14 is adjustable to vary the actual open area for spacing between rods. This feature of the present invention promotes adaptability of the tray for use in process vessels requiring mixing of liquids or slurries wherein rod spacing or open area between rods may be varied to meet the particular mixing requirements involved. Furthermore, adjustability of the rod spacing by the present invention provides adaptability of the tray device for use in supporting column packing such as Raschig rings, Berl saddles and the like which vary in size. In other words, spacing between rods may be increased for large saddles or rings and decreased for smaller sized packing media merely by varying the width of each boss 16 and increasing or decreasing the number of rods 14.

Thus provided is a tower tray device comprising a plurality of rods for support annularly within a tower or vessel wherein each rod has boss means at both ends thereof for maintaining the rods in spaced relation and for removably securing the rods to support means within the vessel.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:

1. An improved tray for use with process vessels, towers and the like, including:
    a plurality of rods,
    circular support means for receiving the rods, and
    means engageable with the ends of each rod for maintaining the rods in spaced relation and for removably securing the rods to the support means to form an annular openwork, said means comprising a boss having an axial recess at one end thereof to receive the rod and a chamfer at the other end for engagement with the circular support means.
2. The invention of claim 1 wherein, each of the rods comprises a rigid shaft having a coating of fluorocarbon covering the surface of said shaft.
3. The invention of claim 2 wherein the boss is formed of a fluorocarbon material.
4. The combination with a process vessel, tower or the like of an improved tray comprising,
    a plurality of rods, each said rod comprising a rigid shaft and having a coating of fluorocarbon material covering the surface of said shaft,
    means for supporting the rods annularly within the vessel, and
    means engageable with the ends of each rod for maintaining the rods in spaced relation and for removably securing the rods to the support means to form an annular openwork, said means comprising a boss having an axial recess at one end thereof to receive the rod and a chamfer at the other end for engagement with the means supporting the rods annularly within the vessel.
5. The invention of claim 4 wherein the boss is formed of a fluorocarbon.

References Cited

UNITED STATES PATENTS

| | | | |
|---|---|---|---|
| 2,711,308 | 6/1955 | Cogan | 261—113 |
| 2,750,174 | 6/1956 | Cogan | 261—113 |
| 2,860,860 | 11/1958 | Wilson | 261—113 |
| 2,896,928 | 7/1959 | Osbourne | 261—113 |
| 3,064,955 | 11/1962 | Boutte | 261—113 |

FOREIGN PATENTS 198,100   5/1923   Great Britain.

ROY D. FRAZIER, *Primary Examiner.*

WILLIAM D. LOULAN, *Assistant Examiner.*